Figure 1:
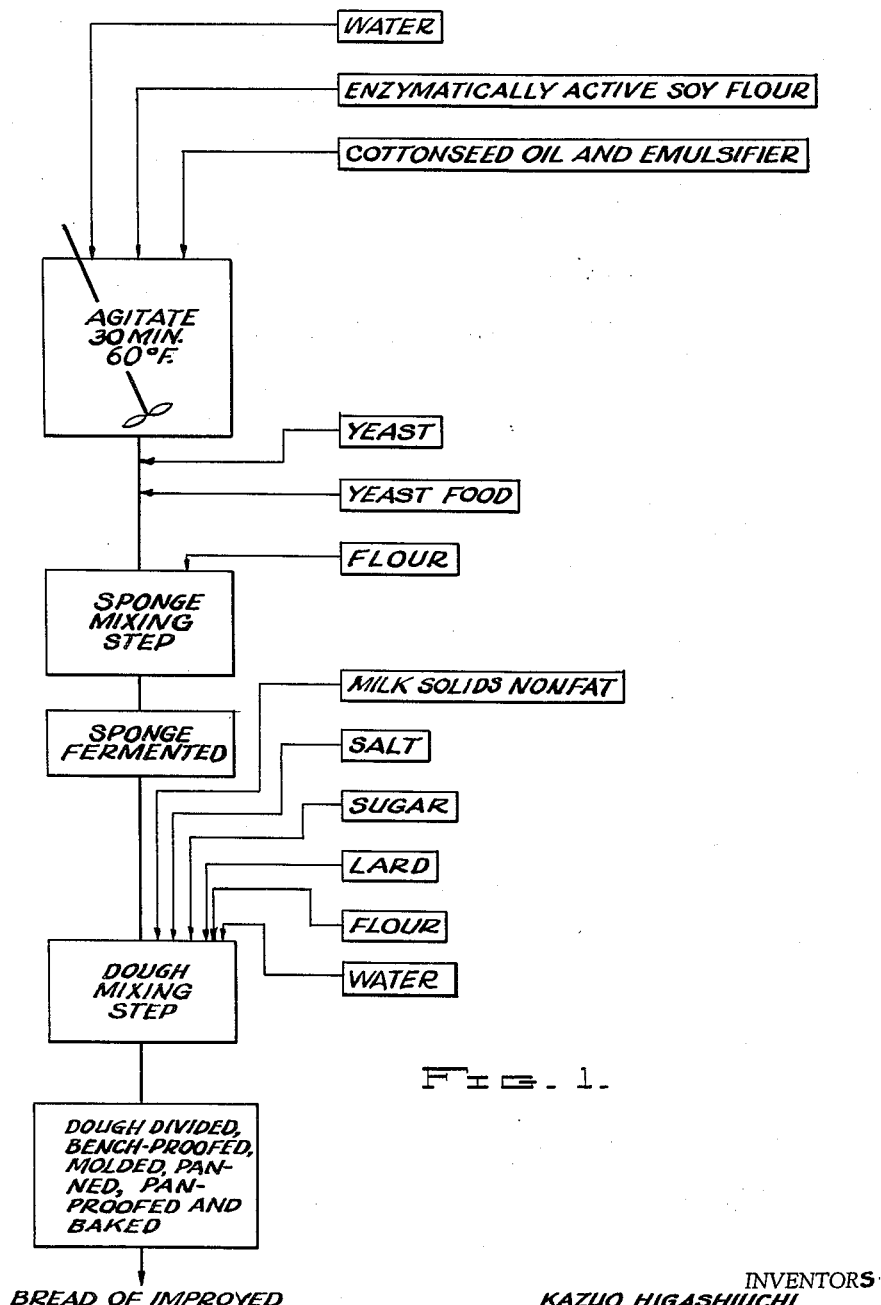

United States Patent Office 3,108,878
Patented Oct. 29, 1963

3,108,878
METHODS FOR PREPARING YEAST-LEAVENED BAKED GOODS
Kazuo Higashiuchi, Chicago, Albert W. Kleinschmidt, Park Forest, and Charles G. Ferrari, Evanston, Ill., assignors to J. R. Short Milling Company, Chicago, Ill., a corporation of Illinois
Filed Nov. 20, 1961, Ser. No. 153,646
11 Claims. (Cl. 99—90)

This invention relates to the production of baked goods and, more particularly, to the production of yeast-leavened baked goods of improved flavor and other characteristics. Though applicable generally to the production of yeast-leavened baked goods, including rolls, buns and the various breads, the invention offers special advantages in the production of white bread.

Because of various economic considerations, including particularly the increasing cost of production and distribution, yeast-leavened baked goods, as produced in volume for normal retail consumption, have changed markedly in the last two decades. While some truly significant improvements have been achieved, such as vitamin- and mineral-enrichment and increased shelf life, other changes have not always been to the consumer's liking. In particular, baking methods which the industry has found it necessary to adopt in recent years frequently tend to produce products which, at least to the tastes of many consumers, lack flavor and body.

A general object of the invention is accordingly to provide an economical method, compatible with present baking practices, for producing yeast-leavened baked goods of improved quality.

A particular object is to devise a method for producing bread and other yeast-leavened baked goods of improved flavor.

Another object is to devise an improved method for the economical production of flavorful white bread.

A further object is to provide a method for improving yeast-leavened baked products prepared by baking procedures which are based upon the use of a brew or broth.

Stated in general terms, the invention is predicated upon in situ formation of an edible enzyme-peroxidized fat in aqueous liquid employed in the production of yeast-leavened dough from which baked goods are prepared. Enzyme-peroxidized fats have heretofore been proposed as additives for bread doughs, particularly for bleaching the same, as disclosed in U.S. Patents 1,994,992 and 1,994,993, issued March 19, 1935, to Louis W. Haas and Herbert O. Renner. In accordance with those patents, fats such as vegetable oils were peroxidized by agitating the fat either with a clarified aqueous extract from an enzyme source material, such as soybean meal, or with an unclarified enzyme solution containing the source material, agitation being carried out in such fashion as to incorporate oxygen in the liquid, and the peroxidized fat was then recovered in relatively pure form. When employed in sufficiently high quantities in yeast-leavened doughs, such purified peroxidized fatty products have shown definite dough bleaching capabilities. However, their relatively high cost, and the quantities required for effective dough bleaching, have heretofore precluded adoption of the peroxidized fats as additives in commercial baking operations. A further disadvantage heretofore encountered with these materials is the fact that, when used as additives at levels adequate for effective dough bleaching, they have caused flavors in the finished baked goods which, by most standards, are objectionable.

The present invention arises from the surprising discovery that, if relatively small proportions of an edible, enzyme-peroxidizable fatty material and a material containing in active form an enzyme capable of causing peroxidation of the fatty material are incorporated in aqueous liquid from which yeast-leavened dough is to be prepared, and the liquid is subjected to at least a minimum agitation for enzyme peroxidation under certain controlled conditions, the resulting relatively small amount of enzyme-peroxidized fatty material, formed in situ, is effective to cause a marked improvement in the flavor, and frequently other characteristics, of the finished baked goods.

The invention can be successfully applied to conventional batch procedures for preparing bread and the like. In those cases, the fatty material and the enzyme material are advantageously introduced into water to be incorporated in the dough, agitation being carried out, under conditions hereinafter described, to effect enzyme-peroxidation of the fat. In the case of procedures wherein a brew or broth is prepared and then incorporated in the dough, the fatty material and enzyme material are incorporated in the water for the brew or broth, or at a later stage during preparation thereof. The invention is particularly useful in the continuous bread making processes now being adopted by the baking industry. In those processes, the fat and enzyme material are employed in the brew in such fashion that enzyme-peroxidation of the fat is accomplished in the early portion of the brew preparation procedure. In all of its applications, the invention depends upon presence of both the fat and active lipoxidase in aqueous liquid which is to be used in the dough, and agitation of the liquid under controlled conditions such that the lipoxidase effects peroxidation of the fat to such an extent that the fat provides an active peroxide content of 5–60 parts per million, computed as hydrogen peroxide equivalents, based on the wheat flour weight.

Stated generally, lipoxidase in any edible form, suitable for introduction into an aqueous system, can be employed. For practical purposes, particulate legume materials, hereafter referred to generically as flours, represent the best enzymatic materials for use in accordance with the invention. Thus, enzymatically active soybean flour, soybean meal and soybean flakes are all excellent lipoxidase-containing materials for use in the invention. Equivalent materials derived from peas, peanuts, lima beans, navy beans and lentils are suitable. When an oil-rich material such as soybean material is employed, it can be either full-fat, low-fat or fat-free, so long as it exhibits adequate lipoxidase activity.

The fats useful in accordance with the invention are those which can be peroxidated by enzymes. That is, the invention can employ any unsaturated, edible fat containing linoleic, linolenic or arachadonic acid, alone or in combination. Edible oils of vegetable origin are suitable, including specifically cottonseed oil, soybean oil, corn oil, peanut oil, safflower oil, poppyseed oil, sunflower oil, wheat germ oil, sesame oil and oiticica oil margarines made therefrom. The invention can also be practiced with peroxidizable animal fats, including specifically soft lards, margarines containing animal fats, oils extracted from animal skins in the manufacture of gelatin, and refined marine oils. The fat is employed in an amount equal to 0.1–6.0% of the weight of the wheat flour to be used in the dough.

Peroxidation of the fat occurs in the aqueous liquids involved because the active lipoxidase, extracted from the source material by the water, is maintained in intimate contact with the fat in the presence of oxygen. Agitation of the liquid, advantageously a continuous agitation, is essential, both to assure solution of the enzyme and to accomplish introduction of air, as an oxygen carrier, into the aqueous system.

Control of temperature, pH and time of treatment is of the utmost importance to success of the invention, not only to avoid destruction of enzyme activity but also to promote the action of the lipoxidase in causing peroxidation of the fat.

We have found that the method of the invention is operative when the temperature of the aqueous liquid is maintained in the range of 40–110° F., temperatures above that range tending to destroy the lipoxidase, while temperatures below the range appear to inhibit peroxidation of the fat.

Careful control of the pH of the liquid system is of particular importance, since the enzyme and the reactions involved are sensitive to variations in pH and the baking procedures to which the invention appies are, of course, characterized by changing pH. The invention is operative so long as the pH of the aqueous system is maintained above at least 4.0, but not materially above 8.5, during enzyme peroxidation of the fat. At a pH about 4.0, the lipoxidase is not effective to peroxidize the oil. At pH values above 8.5, the effect of the lipoxidase is to produce, by enzyme-peroxidation, products yielding poor flavor.

The time period for the enzyme peroxidation of the fat depends in part upon the quantity of lipoxidase employed, the effectiveness of the agitating step to maintain a good dispersion of the fat, oxygen source and enzyme material in the aqueous liquid, the temperature, the pH and, of course, the desired peroxide activity to be carried into the dough. Using a relatively high proportion of lipoxidase, and agitating the liquid with a rotary agitator sufficiently vigorously to maintain a distinct vortex in the liquid, a minimum time period of 10 minutes is acceptable, providing the pH is above 5.4. Under practical conditions in commercial bakeries, the liquid system is agitated for considerably longer periods, ranging up to 6 hours.

With legume flours as the lipoxidase-containing material, amounts of the legume material ranging from 0.05% to 5.0% of the weight of the wheat flour to be used in the dough can be employed. In commercial practice, particularly when the invention is applied to baking procedures involving a brew or broth, amounts of enzymatically active legume flour in the range of 0.1–1.0% of the wheat flour are particularly advantageous. In all events, the lipoxidase-containing material must have a substantial enzyme activity, and materials having an active lipoxidase content equal to at least 10% of the active lipoxidase content of unprocessed soybean flour have been found to be satisfactory.

Use of an enzyme source material of the type of the legume flours is not essential to success of the method and it will be understood that specially prepared or refined lipoxidase concentrates can be utilized. In this regard, it will be understood that lipoxidase cannot, for practical purposes, be isolated for analytical purposes, and the lipoxidase content of a source material, whether of the type of the legume flours or a manufactured concentrate, is determined by measuring lipoxidase activity. When employing a lipoxidase concentrate, the concentrate is used in an amount which exhibits the same lipoxidase activity as a quantity of enzymatically active legume flour equal to 0.05–5.0% of the wheat flour for the dough.

It is essential that both the lipoxidase-containing material and the fat be effectively dispersed in the aqueous liquid, and maintained so throughout the period in which enzyme peroxidation of the fat is to be accomplished. The first important factor affecting dispersion is the agitation of the liquid. In commercial practice, it is satisfactory to employ a mixing tank equipped with a rotary agitator of the propeller type, for example, driving the agitator at a rate such that a distinct, observable vortex appears in the liquid. The rate at which the agitator is driven of course depends on the relative size of the tank, the specific agitator design, and the quantity of liquid, but agitator speeds in excess of 75 r.p.m., typically 100–150 r.p.m. for agitator-tank combinations with which bakeries are now ordinarily equipped, are effective both to disperse the enzyme and fat materials initially and to maintain them in dispersed condition.

Employing legume flours as the lipoxidase material, these finely particulate materials are carried readily into the aqueous liquid when rotary agitation adequate to create a vortex in the liquid is employed. Liquid fats, such as the vegetable oils, tend to form a surface layer on the water, and at least a surface film of the oil can be allowed to persist for substantial periods, without seriously affecting the desired enzyme-peroxidation, since there is extensive contact of the fat, enzyme and air at the interface between the water and oil.

Formation of a fat layer or film on the surface of the aqueous system, however, presents another problem which must be dealt with, particularly when employing a legume flour as the source material. Enzyme-peroxidation of the fat is promoted because the water into which the materials are dispersed is effective to dissolve the enzymes. Hence, the rate and extent of the enzyme-peroxidation depends on both the speed with which the enzyme is extracted from the source material and the amount of enzyme which goes into solution. If the fat is introduced into the liquid system first, and forms a layer or film on the surface, the particles of enzyme-containing material will become coated with the fat as they enter the liquid. Such coating has been found to retard extraction of the enzyme, seriously limiting the effectiveness of the method. Accordingly, it is advantageous to first disperse the enzyme-containing material and then add the fat, particularly when the fat is an oil, so as to prevent the particles of enzyme-containing material from being coated with fat.

Under conditions normally encountered, we have found that effectiveness of the enzyme-peroxidation of the fat is improved when the best possible dispersion of the fat in the water is accomplished. In this regard, we have found it advantageous to employ an additive or additives promoting emulsification of the fat. In general, any edible emulsifier which is effective to cause prompt emulsification of the fat employed can be used, and the amount thereof can be in the range of 0.1–15.00% of the weight of the fat. We have found it particularly advantageous to employ an emulsifier, or a combination of emulsifiers, containing linoleic, linolenic or arachadonic acids, singly or in combination, so that the emulsifier is itself enzyme-peroxidizable. Thus, as enzyme peroxidizable emulsifiers, we can employ glyceryl monolinoleate, for example, or monoglycerides of the other acids just mentioned. Similarly, glyceryl esters of unsaturated, long chain (15 carbons or greater) fatty acids, containing either one or two acetic acid substituents, e.g., glyceryl diacetic linoleate, are also effective emulsifiers for this invention. Other emulsifying agents which are effective but do not offer the advantage of being enzyme-peroxidizable, include polyoxyethylene monostearate; the tartaric acid esters of monoglycerides; lecithins; dispersible protein-aqueous materials, e.g., substantially pure undenatured soybean protein; and mixed mono- and diglycerides.

The enzyme-containing material and fat can be dispersed in, and enzyme-peroxidation of the fat carried out in, all or part of the water for the dough in conventional batch baking procedures, or all or part of the water for the brew or broth in procedures involving a brew or broth. When enzyme peroxidation is carried out in an amount of water which is only a portion of the total water to be used in preparing the dough, the amount of water employed as the aqueous phase of the system in which peroxidation is carried out is not critical, though amounts of water less than 100% of the weight of the fat will not ordinarily be suitable for practical commercial operations.

From the foregoing, it will be understood that the method of this invention is characterized by certain readily identifiable novel features, including particularly formation of the enzyme-peroxidized fat in situ in aqueous liquid to be used in the dough, and the fact that the starting materials, e.g., soybean flour and a vegetable oil, are carried forward into the dough, all attempts to obtain even relatively pure enzyme-peroxidized oil product being avoided. Thus, the entire enzyme source material, such as the soybean flour, remains dispersed in the aqueous system and is incorporated in the dough.

The foregoing conditions assure, as indicated earlier herein, that the fat will be peroxidized to such an extent that it provides, in the aqueous system for incorporation in the dough, a peroxide content, measured in terms of hydrogen peroxide equivalents, amounting to 5–60 parts per million, based on the weight of wheat flour to be incorporated in the dough. The amount of in situ-formed active peroxide is thus small. Why such small amounts of enzyme-peroxidized fat, produced in accordance with the invention, are effective to markedly improve the flavor, body and general eating qualities of the finished baked goods is not precisely understood. It appears that the fat, once peroxidized, is an especially effective precursor for flavor bodies, including carbonyl compounds such as aldehydes and ketones, which form during baking. As to improvements other than better flavor, it would appear that these must be due to the oxidative effect of the peroxidized fat, the active content thereof acting directly and indirectly on the wheat flour. A main difficulty encountered in attempting to explain success of the invention in improving body, for example, lies in the fact that such improvement can result only when some modification of the proteins in the dough is accomplished. It is not understood how the small level of peroxide activity established in accordance with the invention can be effective to modify the proteins.

Success of the method of this invention in providing better flavor and improved body, for example, is particularly surprising in view of the fact that as explained in copending application Serial Number 153,714, filed concurrently herewith by Charles G. Ferrari, the addition of even substantial quantities of refined or purified enzyme-peroxidized oil to yeast-leavened dough in the modern continuous breadmaking process not only frequently fails to provide any flavor improvement but actually causes the baked product to have an objectionable flavor. In all, it appears that success of the invention arises because of some phenomenon or phenomena which occurs because of the fact that the enzyme peroxidation is carried out in situ and all of the materials employed are carried forward into the dough.

*Example 1*

This example illustrates the invention as applied to the conventional sponge-dough procedure for making white bread, the procedure being outlined by the flow sheet in FIG. 1. As illustrated, enzymatically active soy flour and cottonseed oil are dispersed in the water for the sponge mixing stage, agitation being accomplished for 30 minutes at 60° F. in a propeller-type mixer to effect enzyme peroxidation of the oil.

The formula is as follows, quantities being in parts by weight:

| Ingredient | Dough | Sponge | |
|---|---|---|---|
| | | Dispersion | Mixing |
| Flour | 250.0 | | 450.0 |
| Water | 160.0 | 275.0 | |
| Yeast | | | 17.5 |
| Yeast food | | | 2.0 |
| Milk solids nonfat | 21.0 | | |
| Salt | 14.0 | | |
| Sugar | 35.0 | | |
| Lard | 21.0 | | |
| Enzymatically active soy flour | | 1.75 | |
| Cottonseed oil and emulsifier | | 3.5 | |

Two doughs are prepared, dough A being conventional, without use of the soy flour and oil, dough B employing the soy flour and oil. In dough B, the cottonseed oil employed has incorporated therein an amount of glyceryl monolinolenate equal to 1% of the weight of the oil, so that dispersion of the oil is accelerated, yet the entire oil-emulsifier composition is enzyme-peroxidizable.

In preparing dough B, all of the water for the sponge is introduced into a mixing tank equipped with a propeller-type agitator, and the agitator driven continuously at 100 r.p.m. to agitate the water to any extent sufficient to provide a definite vortex. All of the soy flour is then introduced, being dispersed by the agitation. A full fat, enzymatically active flour is employed. When the soy flour has been dispersed, the oil-emulsifier composition is then poured onto the water and disperses rapidly. With the aqueous composition held at 60° F., agitation is then continued for 30 minutes, at the end of which time the entire composition, including water, now-peroxidized oil, and soy flour residue, is delivered to a conventional mixing machine for preparation of the sponge. All of the sponge ingredients are then added, and mixing carried out conventionally.

After the sponge mixing step, both doughs A and B are handled identically. The sponges are fermented at 85° F. for 3 hours and then returned to the mixer for the dough mixing step. Here, the remaining ingredients are added, and the dough is divided, proofed, molded and panned and pan proofed, in accordance with conventional practice. The final dough is then baked for 24 minutes, at 425° F.

Repeated bakes, carried out in this manner so as to compare a conventionally prepared dough (dough A) with one in which cottonseed oil is enzyme-peroxidized in situ in the water for the sponge (dough B), show that bread baked from the dough employing the in situ-peroxidized oil is markedly superior to the bread baked from the conventional dough, the superiority being evidenced by definitely better flavor and body in all tests. Improvements in mastication and crumb color are also usually observed.

To demonstrate that the improvement presented by the baked bread from dough B arises because of peroxide activity imparted to the cottonseed oil, a portion of the aqueous composition at the end of the 30-minute agitation step is removed from the process, the oil recovered therefrom, and the peroxide activity of the recovered oil then determined. Analyzing the recovered oil for peroxide activity, and expressing this as moles of hydrogen peroxide per kilogram of oil, the recovered oil is found to have a peroxide activity of at least 0.05 mole hydrogen peroxide per kilogram of oil.

The foregoing example demonstrates the invention under those circumstances where the pH of the aqueous medium in which enzyme-peroxidation of the oil occurs depends only on the character of the water and the presence of the enzyme material and the oil, other ingredients not being added until adequate enzyme-peroxidation of the oil has been accomplished. Under these circumstances, the pH of the aqueous medium is always adequately high, being well above 5.5.

Example 2

Figure 2:
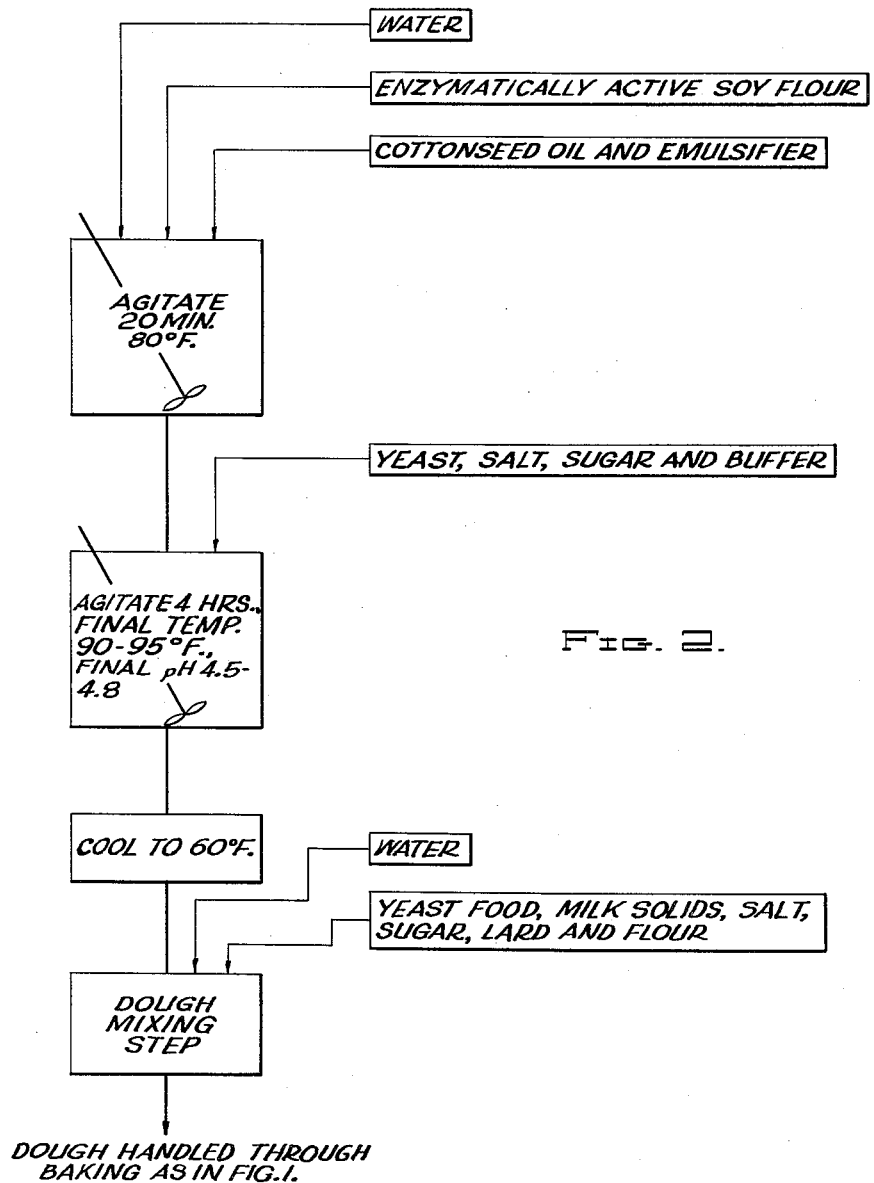
Figure 3:
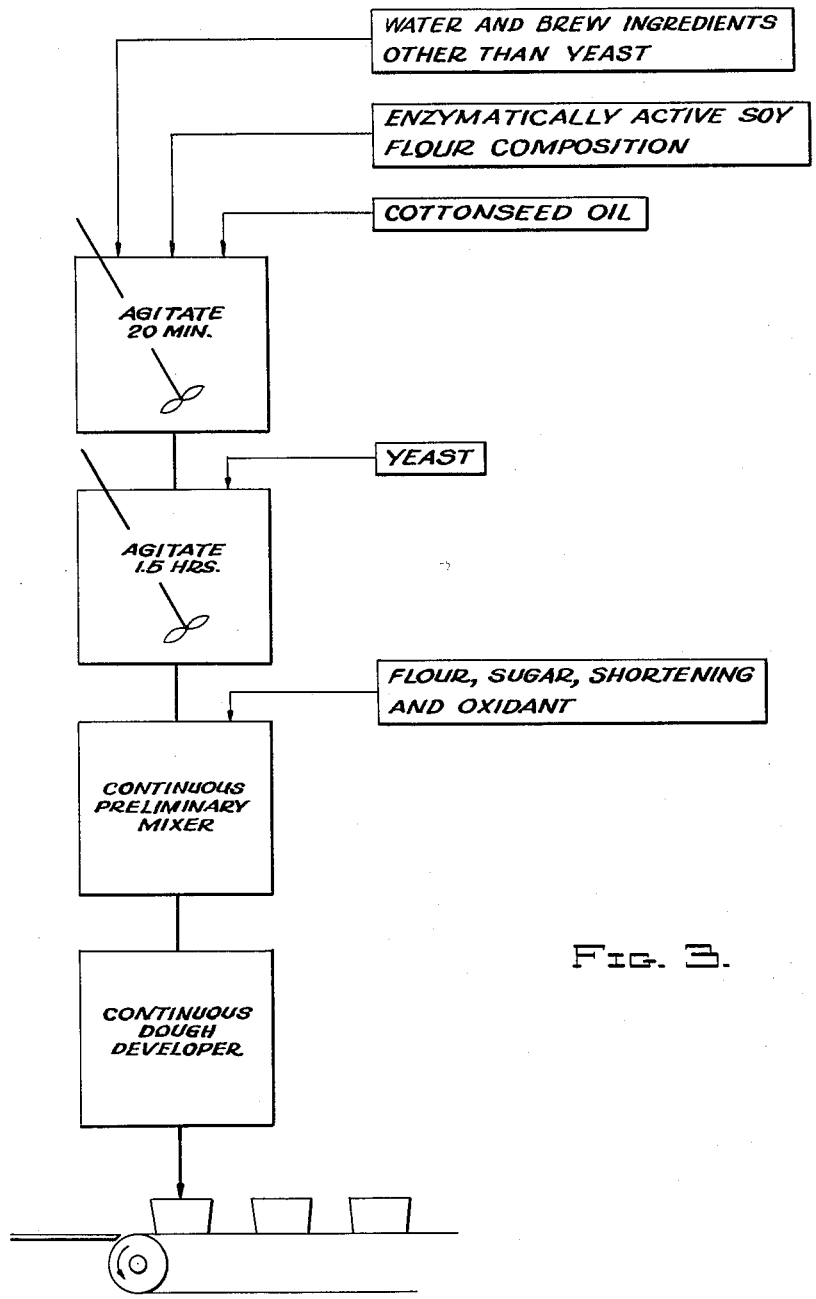

This example illustrates the invention as applied to batch baking procedures employing a yeast-fermented brew, the procedure being outlined in the flow sheet of FIG. 2. Here, enzyme-peroxidation of the fat is again accomplished initially in part of the water for the dough formula, before other ingredients of the formula are added. In this procedure, however, the water, carrying the fat and enzyme material is used for the brew and, since the brew requires agitation for a considerable time, enzyme-peroxidation of the fat continues in the brew stage until the pH of the brew falls so low as to inhibit further peroxidation by enzyme action.

The formula is as follows, quantities being in parts by weight:

| Ingredient | Dough | Brew Dispersion | Brew Ferment |
|---|---|---|---|
| Flour | 700.0 | | |
| Water | 250.0 | 195.0 | |
| Yeast | | | 14.5 |
| Calcium carbonate buffer | | | 1.2 |
| Yeast food | 2.0 | | |
| Milk solids nonfat | 21.0 | | |
| Salt | 7.5 | | 6.4 |
| Sugar | 16.0 | | 19.0 |
| Lard | 21.0 | | |
| Enzymatically active soy flour | | 1.75 | |
| Cottonseed oil and emulsifier | | 3.5 | |

Two doughs are prepared, dough A without the soy flour and oil, and therefore without a separate dispersion step preparatory to setting the brew, and dough B employing the soy flour and oil. In dough B, the soy flour is again a full-fat, enzymatically active flour and the oil again has combined therewith an amount of glyceryl monolinoleate, as an enzyme-peroxidizable emulsifying agent, equal to 1% of the weight of the oil.

In preparing dough B, all of the water for the brew is introduced into a mixing tank equipped with a propeller type agitator, and the agitator is driven at 100 r.p.m. to agitate the water to an extent sufficient to cause a definite vortex in the water. All of the soy flour is then introduced and, after the soy flour has been distributed through the water, the oil-emulsifier composition then being poured onto the surface of the water. The water is introduced to the tank at a temperature of 80° F. and held at this temperature throughout the agitation period of 20 minutes.

One half of the resulting aqueous composition, consisting now of water, enzyme-peroxidized oil and soy flour residue, is then introduced into a second tank equipped with a propeller agitator, the liquid being still at 80° F. The yeast, salt and sugar for the brew are then added, and the composition agitated for 10 minutes. The remaining half of the aqueous composition, and finally the calcium carbonate buffer, are then added to complete the initial brew composition.

Until employed for brew preparation, the aqueous composition has a relatively high pH, dependent only on the water, the soy flour and the oil-emulsifier composition, the value being in excess of 5.5 but not above the neutral point. Immediately following full brew formulation in the manner just described, the pH of the composition is typically 6.0–6.5.

The full brew composition is now agitated for 4 hours to accomplish further enzyme-peroxidation of the oil-emulsifier composition and to ferment the brew. In this time period, the temperature of the composition increases, typically to 90–95° F., and the pH falls, typically to 4.5–4.8. Also within this period, the enzyme-peroxidation of the fat ceases, due to decrease in the pH and to exhaustion of the enzyme source. The brew is then cooled to 60° F. and held for use in preparation of the dough.

In preparing the dough, the additional salt, sugar and other solid ingredients, including flour, needed for the dough are introduced to the dough mixer. The brew is then metered in, followed by additional water, and the dough is mixed until almost stringy. The completed dough is then handled as per Example 1.

Comparing the baked bread from doughs A and B, the latter is found to be definitely superior in flavor and body, and usually superior in mastication and crumb color.

While the brew procedure of this example has been described for the production of white bread, this method is particularly useful for producing other types of breads, as well as rolls of various kinds.

As compared to Example 1, the procedure of Example 2 affords an additional period, of indeterminate duration, for enzyme-peroxidation of the oil as fermentation of the brew proceeds.

The invention finds perhaps its greatest usefulness in connection with present-day continuous processes for making bread, such processes being disclosed, for example, in U.S. Patent 2,931,320, issued April 5, 1960, to David Bandel, and 2,953,460, issued September 20, 1960, to John C. Baker. Such processes depend upon use of a fermented brew, preparation of a preliminary dough mix, and continuous development of the preliminary mix into a full dough. Truly continuous, these processes prepare the preliminary mix continuously in one zone, pass this mix into a confined zone, continuously work the dough mechanically there to accomplish development, and then deposit the developed dough automatically in the baking pans.

Though the new continuous methods have already achieved extensive commercial acceptance, they nevertheless still face important obstacles. For the most part, these difficulties stem from the fact that the continuous process produce a rather novel type of bread characterized, for example, by an extremely fine, soft, fragile internal structure resembling somewhat the interior of pound cake. To many, this characteristic alone is not a drawback. However, bread from the continuous methods is also unusually bland in taste and the lack of taste, coupled with the relative lack of body or "substance" arising because of the cake-like internal structure, is frequently considered to make the produce unappealing.

Unfortunately, the industry has as yet found no way to improve the bread made by the continuous processes. The internal structure thereof can be improved by the addition of small amounts of certain proteins, as disclosed in copending application Serial Number 787,794, filed January 20, 1959, by Charles G. Ferrari, and now Patent 3,006,765. Inorganic bread improvers can be incorporated in the manner disclosed in U.S. Patent 2,971,845, issued February 14, 1961, to Charles G. Ferrari. Heretofore, however, no successful method has been proposed for improving the flavor of the bread, and particularly for simultaneously improving flavor and body.

The following example illustrates the invention as applied to the new continuous methods:

Example 3

A commercial scale continuous plant, employing equipment supplied by Wallace & Tiernan, Inc. (Baker Process Co., subsidiary), Belleville, N.J., generally in accordance with the aforementioned U.S. Patent 2,953,460, was employed to carry out two runs for the production of white bread. Run A was made in accordance with this invention, employing a refined cottonseed oil and an enzymatically active soybean flour composition. Run B was carried out without the oil and soybean flour composition. Both runs were made on fully operating scale and careful comparison of the finished white bread was made between the product of runs A and B.

The overall dough formula, exclusive of oxidant, was as follows:

| Ingredient | Lbs. | Oz. | Percent by weight (based on flour) |
|---|---|---|---|
| Flour | 3,414 | | 100.00 |
| Water (pH 7.1) | 2,253 | | 66.00 |
| Corn sugar | 153 | 10 | 4.50 |
| Granulated sugar | 153 | 10 | 4.50 |
| Salt | 76 | 13 | 2.25 |
| Buttermilk powder | 51 | 2 | 1.00 |
| Milk powder | 51 | 2 | 1.00 |
| Yeast food | 6 | 13 | 0.20 |
| Calcium acid phosphate | 5 | 2 | 0.15 |
| Calcium propionate mold inhibitor | 8 | 9 | 0.25 |
| Lard | 93 | 3 | 2.75 |
| Mixed mono- and diglyceride bread softener | 3 | 7 | 0.10 |
| Stearin flakes | 9 | 4 | 0.27 |
| Yeast | 85 | 6 | 2.50 |
| Enzyme composition consisting of 1 part by weight full fat enzymatically active soy flour and 3 parts by weight partially dextrinized corn flour | 34 | | 1.00 |
| Refined cottonseed oil | 17 | | 0.50 |

The total water, less that for the oxidant solution, is introduced into a mixing tank equipped with a propeller type agitator rotated at 125 r.p.m. All of the brew ingredients except the yeast are now added, being dispersed and dissolved by the continued agitation. Thus, all of the salt, milk, yeast food, phosphate, mold inhibitor, bread softener, and 165 lbs. (82.5 lbs. of each) of the sugar are added at this stage. All of the enzyme composition is then added. After the particulate enzyme composition has been dispersed throughout the aqueous composition as a result of continued agitation, the refined cottonseed oil is then poured in and dispersed by continued agitation. Agitation is then continued for 20 min., a period adequate to effect substantial enzyme-peroxidation of the cottonseed oil. The pH of the aqueous composition at the time of addition of the enzyme composition is 5.51.

After blending, the composition is mixed as first described in this example, with the agitator rotated continuously at 125 r.p.m. The yeast, of the compressed type, is introduced by dumping the same into the tank. At this stage, the pH of the composition is 5.42. Agitation is continued for 1¾ hrs., at the end of which period the pH has fallen below 4.90. The brew is then transferred to a holding tank for delivery to the continuous preliminary mixer when needed.

Throughout the entire preparation of the brew, the liquid composition is held at a temperature of 84° F.

In preparation of the dough, the brew was metered into the preliminary mixer continuously, along with the remaining dough ingredients, feeding being carried out at rates to provide a dough composition of the formula indicated above. In addition to the ingredients indicated above, there was metered into the preliminary mixer an oxidat composition consisting of potassium bromate, potassium iodate and water, the oxidant being fed at a rate providing 91.3 g. of potassium bromate, 13.0 g. of potassium iodate and 60.0 lbs. of water, based on the above formula. The preliminary mixer was operated conventionally to continuously form a uniform preliminary dough mixture. This mixture was pumped continuously through the dough developer and the fully developed dough extruded directly into the baking pans, the doughs for both run A (including the enzyme composition and cottonseed oil) and run B (without those ingredients) having the usual appearance of doughs commonly produced on this type of continuous equipment. The doughs were baked continuously in conventional fashion, each run being identical in this regard.

On comparison, the flavor, body and mastication characteristics of the bread from run A was found to be markedly superior to the bread from run B.

The foregoing example illustrates application of the invention to a continuous bread making procedure in which the brew ingredients, except for the yeast, are added to the water at the outset of the process. To some degree, this militates against enzyme peroxidation of the oil because the brew ingredients tend to lower the pH of the aqueous composition. Better results are obtained, in accordance with the invention, when a preliminary period of agitation is provided, before addition of any of the brew ingredients to the water, in which preliminary period the pH is maintained at a high level to promote more rapid and extensive enzyme peroxidation of the oil, as illustrated in the following example:

*Example 4*

As in Example 3, the procedure of this example is again carried out in a commercial scale continuous plant employing equipment supplied generally in accordance with the aforementioned Patent 2,953,460, the method being tailored for the production of commercial white bread.

The formula for the brew, using amounts suitable for a quantity of brew adequate for 30 mins. of production, is as follows:

| Ingredient: | Amount |
|---|---|
| Water | 730 lbs. |
| Sugar | 94 lbs. |
| Yeast | 29 lbs. |
| Milk | 35 lbs. |
| Salt | 23 lbs., 6 oz. |
| Yeast food | 3 lbs., 8 oz. |
| Calcium acid phosphate | 2 lbs., 5 oz. |
| Calcium propionate mold inhibitor | 1 lb., 3 oz. |
| Enzyme composition consisting of 1 part by weight full fat enzymatically active soy flour and 3 parts by weight partially dextrinized corn flour | 11 lbs., 6 oz. |
| Refined cottonseed oil | 5 lbs., 11 oz. |

All of the water, at a pH of 7.0, was introduced to a mixing tank equipped with a propeller-type agitator rotated at 125 r.p.m. The enzyme composition was then introduced and thoroughly dispersed in the water, after which the cottonseed oil was poured onto the top of the aqueous composition, dispersing promptly. Approximately 5 mins. of agitation was allowed between addition of the enzyme composition and addition of the oil. The resulting aqueous composition, with the oil now occurring as the dispersed phase of an emulsion and with the solid particles of the enzyme composition uniformly dispersed, was then agitated for 25 mins. At the end of this time, the pH of the composition was 6.4.

All of the remaining brew ingredients were then introduced, except for the yeast, and the composition was agitated for 15 mins., the pH then being about 5.35. Until this stage of the procedure, the aqueous composition was held at a temperature in the range of 83–85° F. The yeast was then added and mixing was continued for 2 hours. and 35 mins., at the end of which time the entire brew composition, now completed, was transferred to the holding tank for delivery to the preliminary dough mixer. At the time of transfer of the brew, the pH thereof was 4.2.

The fermented brew was then metered into the preliminary dough mixer at a rate of 30 lbs. per minute. Bleached bread wheat flour was supplied to the preliminary dough mixer at a rate of 39 lbs. per minute. A blended shortening, comprising 95 parts by weight lard, 5 parts by weight cottonseed flakes and approximately 16.75 parts by weight of a conventional bread softener, was metered into the preliminary dough mixer at a rate of 3.7 lbs. per minute, the shortening blend being maintained at 140–150° F. so as to be in pumpable liquid condition.

A liquid oxidant solution, comprising 60 lbs. water, 42.4 g. potassium bromate and 10.6 g. potassium iodate, was metered into the preliminary dough mixer at the rate of 1 lb. per minute. The preliminary mixer was operated in conventional fashion to provide a uniform dough mixture, but not for dough development.

The preliminary dough mixture was pumped continuously into the high speed dough developer which supplied fully developed dough at a rate of approximately 71 lbs. per minute. Thereafter the dough was handled in conventional fashion for continuous bread plants, being baked in a continuous oven.

The finished bread was compared with bread made on the same day in the same equipment from the same formula, but without the enzyme composition and cottonseed oil. The bread made in accordance with this example was found to have an excellent flavor, while the bread made without the enzyme composition and oil was relatively bland and tasteless. The bread in accordance with this example also exhibited improved body, as compared to that conventionally produced.

As has already been indicated, best results are obtained when a pH of the aqueous composition containing the enzyme material and the fat to be peroxidized is maintained as high as possible within the range hereinbefore defined. It has been found to be advantageous, in this regard, to employ the invention in connection with continuous bread making procedures which employ wheat flour in the brew, since the flour has a deciding buffering effect and so minimizes the decrease in pH which would normally occur because of presence of the yeast. The following example is illustrative:

*Example 5*

White bread was prepared in a commercial scale continuous bread making plant employing equipment supplied by the American Machine & Foundry Company. The equipment was of the type constructed by the American Machine & Foundry Company under the trademark Amflow, being generally similar to that disclosed in the aforementioned Patent 2,931,320. The general organization of the plant is illustrated on pages 10 and 11 of Bakers Weekly for August 14, 1961.

Preparation of the brew was commenced by mixing 200 lbs. water, 16 lbs. yeast food, 50 lbs. corn syrup, 84 lbs. yeast and 3 lbs. calcium acid phosphate in the ingredient mixer. This initial mixture was then delivered to the blending tank and 204 lbs. of the wheat flour for the dough formula and 665 lbs. of water were added.

Two hundred pounds water, 61 lbs. salt, 30 lbs. milk and 5 lbs. calcium propionate mold inhibitor were then introduced to the ingredient mixer. Twenty-seven pounds of enzyme composition, consisting of 1 part by weight full fat enzymatically active soy flour and 3 parts by weight of partially dextrinized corn flour, was then dispersed in the aqueous composition in the ingredient mixer. When dispersion of the enzyme composition had been accomplished, 13.5 lbs. of refined cottonseed oil was then added. This composition was agitated in the ingredient mixer for 30 mins. and then pumped to the blending tank and combined therein with the preliminary brew composition. An additional 204 lbs. of the wheat flour and 665 lbs. of water were then added to the blending tank and mixing was continued for 40 mins. The resulting brew composition was then delivered to the liquid sponge tank.

The pH of the water was approximately 7.0 initially. The pH of the brew composition was followed in the blending tank and was found steady at 5.0–5.1 during the entire residence time of the complete brew composition.

The brew was held at approximately 85° F.

From the liquid sponge tank, the brew was metered into the screw-type preliminary dough mixer and there combined with flour, shortening and an oxidant solution. The feed rates for the brew and flour were maintained such that, including the flour employed in the brew, the total dough made with the brew embodied 2700 lbs. of flour. The shortening consisted of 64 lbs. lard, 8 lbs. stearin flakes and 18 lbs. conventional additives including bread softeners, the shortening feed rate being such that all of the shortening was employed in the dough prepared from the brew above described.

The oxidant solution consisted of 50 lbs. water, 73.8 g. potassium bromate and 12.3 g. potassium iodate, the feed rate again being such that all of the oxidant solution was employed in the dough made with the above-described brew.

The preliminary dough mixture produced in the screw-type mixer was pumped through the dough developer and the resulting dough was handled in continuous fashion, through the baking stage, in the manner now conventional with plants of this particular type.

In order to obtain a control product, bread was also made in the same equipment under the same conditions with the same formula, omitting only the enzyme composition and the cottonseed oil.

The bread made in accordance with this example was carefully compared with the control bread and found to be of markedly improved flavor and better body and texture. Improvements in mastication and oven spring were also observed in the bread made in accordance with this example.

*Example 6*

We have found it to be particularly advantageous, when the invention is employed in the continuous bread making procedure, to incorporate an emulsifier directly in the enzyme-peroxidizable oil to assure that the oil will be immediately dispersed in the aqueous liquid so that maximum enzyme peroxidation can be accomplished within the relatively short time periods available. Thus, on repeating the procedures of Examples 3–5, but using a refined cottonseed oil in which is dispersed an amount of glyceryl monolinoleate, derived from safflower oil, equal to 10% of the combined weight of the oil and glyceryl monolinoleate, markedly better improvement in flavor of the finished bread is noted in comparison with the bread of Examples 3–5.

In general, when the invention is applied to the continuous bread process, it is desirable to include a hardened fat in the peroxidizable oil when an oil is used. The amount of hardened fat employed is 5–15% of the weight of the oil, and this amount of hardened fat is in addition to such hardened fat as may be used with the shortening added in the preliminary mixing operation. Typical hardened fats which can be used are cottonseed flakes, peanut flakes, and stearin. The effect of the added hardened fat is to preserve side wall strength in the finished bread.

In considering the examples, it will be noted that all employ soybean flour as the enzyme source. In each example, others of the active lipoxidase-containing materials hereinbefore mentioned can be employed satisfactorily. It is important to note that the invention is successful even though it employs an enzyme material, such as soybean flour, which is particularly rich in the fatty acid type of lipoxidase. In the aforementioned copending application Serial Number 153,714, it is pointed out that, when enzyme-peroxidized oils are added as such, in purified form, to the dough from which bread is made, poor flavors tend to result if the enzyme source material is one particularly rich in fatty acid lipoxidase, while fats peroxidized with the triglyceride lipoxidase provide flavor improvement. The reason for success of the present invention, even with enzyme sources rich in fatty acid lipoxidase, is not understood. It appears, however, that success results because enzyme peroxidation of the fat is accomplished in situ in water employed in the dough formula, all of the fat and the enzyme source material being carried into the dough without any attempt to isolate the peroxidized fat.

It will be understood by those skilled in the art that various specific embodiments of the invention have been described in detail for purposes of illustration and that changes and modifications therein can be made without departing from the scope of the invention as set forth in the appended claims.

We claim:

1. A method for producing yeast-leavened baked goods of improved flavor, comprising
dispersing in water
an amount of particulate, active lipoxidase-bearing edible material equal to 0.05–5.0% of the weight of the flour to be used in the dough, and
an amount of an edible, enzyme-peroxidizable fat equal to 0.1–6.0% of the flour weight,
said lipoxidase-bearing material having an active lipoxidase content equal to at least 10% of the active lipoxidase content of unprocessed soybean flour;
agitating the resulting aqueous composition
for from 10 minutes to 6 hours
while maintaining the same at a temperature of 40–110° F. and a pH of at least 4.0 but not materially exceeding 8.5, and
thereby effecting peroxidation of the fat to such an extent that the same provides an active peroxide content amounting to 5–60 parts per million, as hydrogen peroxide equivalents, based on the flour weight;
then combining the aqueous composition with flour and other dough-forming ingredients and working the resulting mixture to form a developed dough; and
baking the dough so formed.

2. A method in accordance with claim 1 and wherein said lipoxidase-bearing material is a legume flour, and said enzyme-peroxidizable fat is a vegetable oil.

3. A method in accordance with claim 1 and wherein said lipoxidase-bearing material is introduced into the water before said fat.

4. A method for producing yeast-leavened baked goods of improved flavor, comprising
dispersing in water
an amount of active lipoxidase equal to at least 10% of the active lipoxidase content of an amount of unprocessed soybean flour equal to 0.05–5.0% of the weight of the flour to be used in the dough, and
an amount of an edible, enzyme-peroxidizable fat equal to 0.1–6.0% of the flour weight;
agitating the resulting composition
for from 10 minutes to 6 hours while maintaining the same at a temperature of 40–110° F. and a pH of at least 4.0 but not materially above 8.5, and
thereby effecting peroxidation of the fat to such an extent that the same provides an active peroxide content amounting to 5–60 parts per million, as hydrogen peroxide equivalents, based on the flour weight;
then combining the aqueous composition with flour and other dough-forming ingredients and working the resulting mixture to form a developed dough; and
baking the dough so formed.

5. A method in accordance with claim 1 and wherein the flour employed is bleached bread wheat flour and the product is white bread.

6. A method for producing bread by a procedure which includes the formation of an aqueous, yeast-containing brew which is allowed to ferment and is then combined with other dough-forming ingredients to form a dough mixture, comprising
dispersing in the water for the brew
an amount of a particulate, active lipoxidase-containing edible material equal to 0.05–5.0% of the total weight of the flour to be used in the dough,
said lipoxidase-containing material having an active lipoxidase content equal to at least 10% of the active lipoxidase content of unprocessed soybean flour, and
an amount of an edible, enzyme-peroxidizable fat equal to 0.1–6.0% of the flour weight;
agitating the resulting preliminary brew liquid
for at least 10 minutes
while maintaining the same at a temperature of 40–110° F. and a pH of at least 4.0 but not materially exceeding 8.5;
then incorporating in the brew liquid the yeast and such other brew ingredients as remain to be incorporated;
agitating the resulting brew composition for its normal term,
the brew composition exhibiting a gradual decrease in pH as the term of the brew progresses,
agitation of the initial aqueous composition and agitation of the brew composition effecting peroxidation of said fat to such an extent that the same provides an active peroxide content amounting to 5–60 parts per million, as hydrogen peroxide equivalents, based on the flour weight;
then continuously combining the brew with flour and other dough-forming ingredients to form a preliminary dough mixture; and continuously working said dough mixture to form a developed dough.

7. A method in accordance with claim 6 and wherein said lipoxidase-containing material is introduced into the water before said fat.

8. A method in accordance with claim 6 and wherein said lipoxidase-containing material is a legume flour, said fat is a vegetable oil, and
said step of agitating the preliminary brew liquid for at least 10 minutes is carried out before any ingredient other than the water, said legume flour and said oil are present.

9. A method in accordance with claim 6 and wherein said lipoxidase-containing material is a legume flour, said fat is a vegetable oil,
and brew ingredients other than yeast and wheat flour are added to the brew liquid before expiration of said at least 10 minute period.

10. A method for producing yeast-leavened baked goods of improved flavor, comprising
introducing into water for incorporation in the dough for the baked goods
an amount of particulate, active lipoxidase-bearing edible material equal to 0.05–5.0% of the weight of the flour to be usde in the dough,
an amount of an edible, enzyme-peroxidizable fat equal to 0.1–6.0% of the flour weight, and
an amount of an edible, enzyme-peroxidizable emulsifier for said fat equal to 0.1–15.0% of the weight of the fat,
said lipoxidase-bearing material having an active lipoxidase content equal to at least 10% of the active lipoxidase content of unprocessed soybean flour;
agitating the resulting aqueous composition
for from 10 minutes to 6 hours
while maintaining the same at a temperature of 40–110° F. and a pH of at least 4.0 but not materially exceeding 8.5, and
thereby effecting peroxidation of the fat to such an extent that the same provides an active peroxide content amounting to 5–60 parts per million, as hydroegn peroxide equivalents, based on the flour weight;

then combining the aqueous composition with flour and other dough-forming ingredients and working the resulting mixture to form a developed dough; and baking the dough so formed.

11. In the production of white bread of improved flavor by the continuous method of preparing an aqueous yeast-fermented brew, combining the brew continuously with dough-forming ingredients comprising at least flour and shortening to provide a preliminary dough mixture, continuously subjecting the preliminary dough mixture to a short-time high-energy working step to develop a completed dough, and proofing and baking the dough, the improvement comprising dispersing an active lipoxidase-containing particulate legume material and an edible enzyme-peroxidizable fat in at least a portion of the water for the brew;

agitating the resulting aqueous composition for at least 10 minutes, while maintaining the same at a temperature of 40–110° F. and a pH in the range of 4.0–8.5, to effect enzyme peroxidation of the fat;

combining the entire resulting aqueous composition with the brew ingredients to form a complete brew composition, containing both the enzyme peroxidized fat and said legume material;

then agitating the brew for a period of time effective to accomplish fermentation; and incorporating in the preliminary dough mixture the completed brew, still containing both the enzyme-peroxidized fat and said legume material.

References Cited in the file of this patent

UNITED STATES PATENTS

| 1,994,993 | Haas et al. | May 19, 1935 |
| 2,931,320 | Bandel | Apr. 5, 1960 |
| 2,953,460 | Baker | Sept. 20, 1960 |